United States Patent
Ingram (10) Patent No.: US 9,698,725 B2
(45) Date of Patent: Jul. 4, 2017

(54) MULTIPLE DEGREE OF FREEDOM ALIGNMENT SYSTEM

(71) Applicant: Focal Line Solar LLC, Poplarville, MS (US)

(72) Inventor: John Ingram, Poplarville, MS (US)

(73) Assignee: FOCAL LINE SOLAR LLC, Poplarville, MS (US)

(*) Notice: Subject to any disclaimer, the term of this patent is extended or adjusted under 35 U.S.C. 154(b) by 0 days.

(21) Appl. No.: 14/948,625

(22) Filed: Nov. 23, 2015

(65) Prior Publication Data

US 2017/0149374 A1 May 25, 2017

(51) Int. Cl.
| | | |
|---|---|---|
| *A47G 29/00* | (2006.01) | |
| *H02S 20/30* | (2014.01) | |
| *F16M 11/28* | (2006.01) | |
| *F16M 11/20* | (2006.01) | |
| *H02S 20/10* | (2014.01) | |

(52) U.S. Cl.
CPC ......... *H02S 20/30* (2014.12); *F16M 11/2014* (2013.01); *F16M 11/2057* (2013.01); *F16M 11/28* (2013.01); *H02S 20/10* (2014.12)

(58) Field of Classification Search
CPC . H02S 20/32; F24J 2/10; F16M 11/28; F16M 11/2014
See application file for complete search history.

(56) References Cited

U.S. PATENT DOCUMENTS

| | | | |
|---|---|---|---|
| 1,661,473 A | 3/1928 | Goddard et al. | |
| 4,178,913 A | 12/1979 | Hutchison | |
| 4,306,540 A | 12/1981 | Hutchison | |
| 4,864,317 A * | 9/1989 | Sorko-Ram | H01Q 3/12 126/684 |
| 4,875,052 A * | 10/1989 | Anderson | H01Q 3/08 248/183.2 |
| 5,404,723 A | 4/1995 | Parker et al. | |
| 5,798,517 A * | 8/1998 | Berger | F24J 2/38 126/573 |

* cited by examiner

*Primary Examiner* — Amy Sterling
(74) *Attorney, Agent, or Firm* — Sheppard Mullin Richter & Hampton LLP (57) ABSTRACT

A solar device alignment system enabling greater adjustment of solar devices during installation is provided. The alignment system enables both translational and rotational adjustments in multiple degrees of freedom, allowing solar device installers to make greater adjustments to allow greater tolerances in installing solar devices and limit the need for extensive and expensive surveying and/or redesign of the installation to account for those tolerances.

17 Claims, 7 Drawing Sheets

MULTIPLE DEGREE OF FREEDOM ALIGNMENT SYSTEM

TECHNICAL FIELD

The disclosed technology relates generally to alignment systems, and more particularly, some embodiments relate to alignment systems, for solar devices, having multiple degrees of freedom.

DESCRIPTION OF THE RELATED ART

For solar devices, such as trough concentrators and photovoltaic ("PV") panels with tracking, accurate alignment is necessary to ensure efficient solar energy collection and proper installation in most cases concentrators cannot be installed if mounting alignment is not accurate. Although heavy investment has been made into research and design of more advanced solar devices, the traditionally installation method remains a simple footer system, like those employed for installing poles for highway signs and such. The process includes digging and pouring a concrete footer and inserting one or more bolts, most typically 4 bolts, to create a base, upon which the solar device is bolted. To ensure proper alignment, the process requires extensive time surveying the installation location before, after, and during the process, which raises the cost of such construction. Moreover, as the base is immovable after installation, significant deviations in the placement of the base requires expensive re-installation of the entire footer to ensure proper alignment.

BRIEF SUMMARY OF EMBODIMENTS

According to various embodiments of the disclosed technology, a solar device alignment system is provided that enables adjustments in multiple, up to 6, degrees of freedom. The system includes a base tube in communication with a mounting base. In various embodiments, the mounting base may be a footer, such as a poured concrete pad, and a footer insert; the mounting base may be a ground screw or pile in other embodiments. The base tube is configured to translate in and rotate around the Z-axis in relation to the mounting base. The system further includes a rocker in communication with a rocker saddle disposed on the top of the base tube. The rocker is configured to translate in and rotate around the X-axis in relation to the rocker saddle. The rocker includes one or more connectors for connecting a solar device to the rocker, and enabling the solar device to be translated in and rotated around the Y-axis in relation to the rocker.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Mounting systems for solar devices have generally utilized simple technologies, such as a cement footing with four anchor bolts (four bolt mounting pattern), similar to the type of base and mounting hardware used for installing many different types of support structures. For most types of installations, less intensive planning and care is necessary in installing the four bolt bases. However, for concentrating solar installations, accurate alignment is of paramount concern, inaccuracy can cause breakage or warpage of the solar concentrator, due to stress from misalignment, or complete failure to be able to install due to non-alignment of the solar device mounting points. Since a row of solar parabolic concentrators have a common support structure between each collector in a row and that support structure has a common rotation axis with a shaft to support each end of a collector, if alignment is inaccurate it would not be possible for the collectors to rotate, thus making them inoperable, or causing warpage or breakage upon rotation. In such cases, extensive pre-installation preparation is necessary to ensure that each base is accurately located at the intended location. This preparation involves extensive surveying of the intended location to ensure that each base is properly located. Moreover, surveying must continue before, during and after the installation process to correct any slight deviations from the intended arrangement. If there is a large enough error in installing the bases, the base must either be modified or removed and reinstalled.

The cost associated with ensuring accurate alignment of solar installations is one of the major impediments to reducing the cost of solar installations and thus wider and faster adaptation of solar energy as an alternative to fossil fuels. Although strides have been made in trying to reduce the expense related with the solar devices utilized, fewer efforts at reducing the cost of installation have been undertaken.

Embodiments of the technology disclosed herein are directed towards devices for mounting solar devices. More particularly, the various embodiments of the technology disclosed herein relate to mounts providing multiple degrees of freedom to allow adjustments to be made, reducing the expense of installing solar devices by limiting the need for extensive pre- and post-surveys of base installation and the need to redo the installation to account for deviations in positioning.

Figure 1:
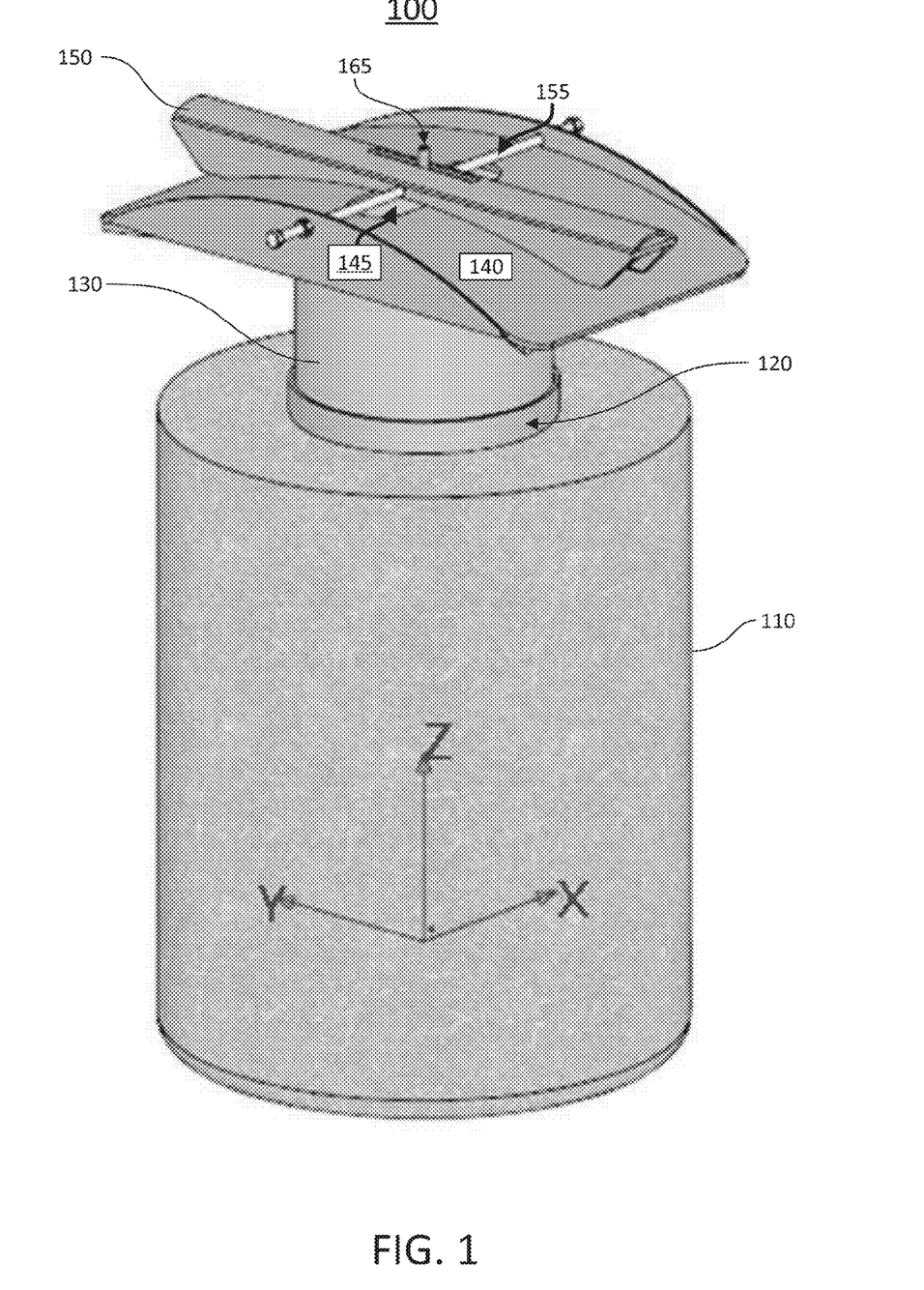
FIG. 1 is a perspective view of an example alignment system in accordance with embodiments of the technology of the present disclosure.

FIG. 1 is an example alignment system 100 in accordance with the technology of the present disclosure. As illustrated, the example alignment system 100 is implemented with footer 110. The footer 110 may be made out of concrete, reinforced concrete, or other material sufficient to support and transfer the load of the solar device to the ground. A footer insert 120 is configured to be inserted within footer 110. In various embodiments, the footer insert 120 may comprise stainless steel, steel, aluminum, plastic, carbon fiber, or any metal alloy. One or more of the above identified materials may be used in some embodiments.

A base tube 130 is configured to mate with the footer insert 120. In various embodiments, the interaction between the base tube 130 and the footer insert 120 form the basis for translation and rotation along and around the Z-axis. The Z-axis rotation and translation will be discussed with greater respect to FIGS. 6A and 6B. The base tube 130 may comprise stainless steel, steel, aluminum, plastic, carbon fiber or any metal alloy. One or more of the above identified materials may be used in some embodiments.

The base tube 130 and the footer insert 120 may be affixed together after the solar device is mounted in the proper orientation related to the Z-axis. In various embodiments, the base tube 130 may be affixed to the footer insert 120 via one or more mechanical fasteners. Non-limiting examples of mechanical fasteners include: screws; bolts; tension pins; or clamps. Some embodiments may utilize welding, brazing, grouting, concreting, epoxying or other fusion techniques to connect the base tube 130 and the footer insert 120.

Figure 7:
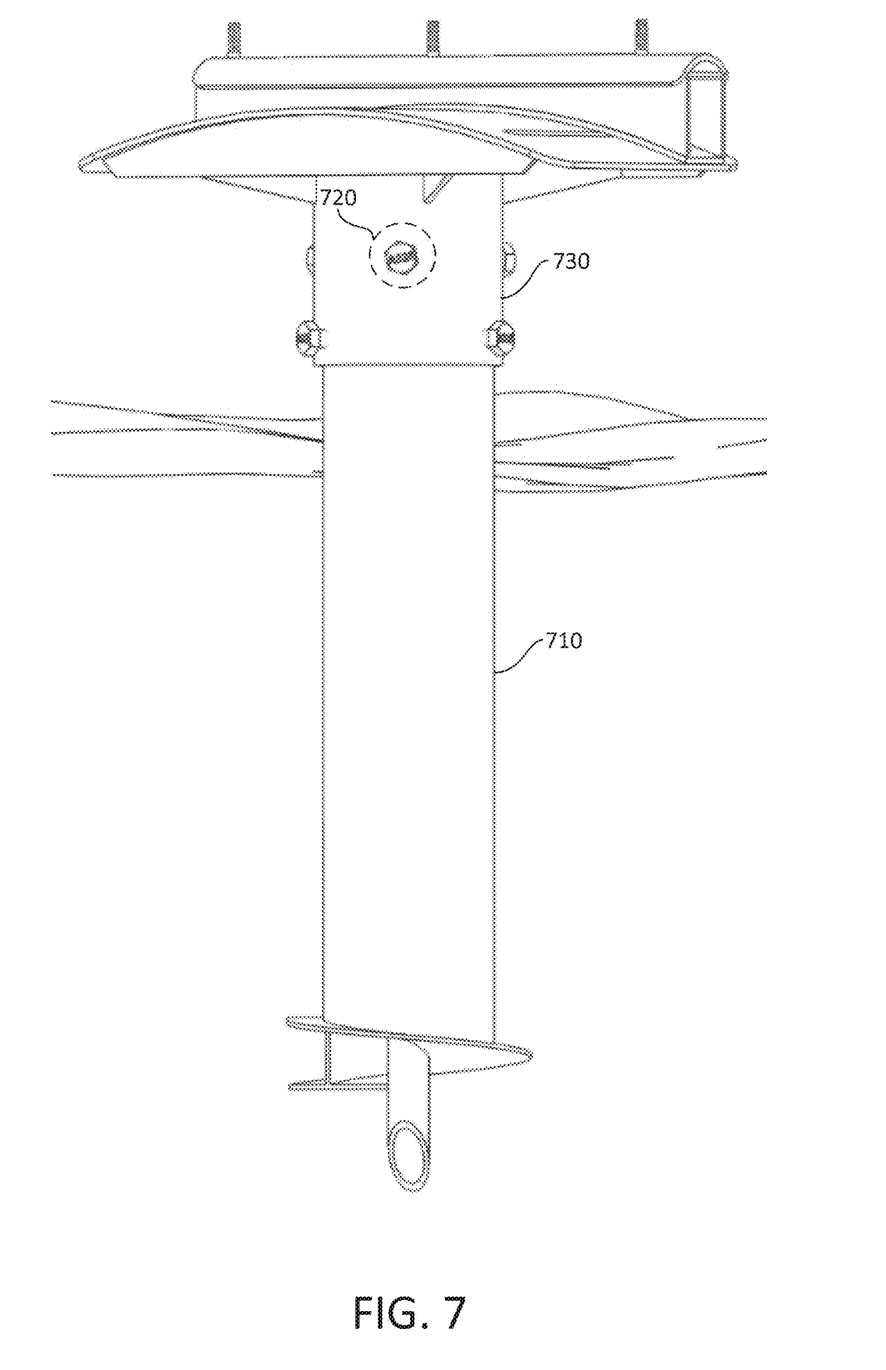
FIG. 7 illustrates another example alignment system in accordance with embodiments of the technology of the present disclosure.

Although illustrated as including a footer insert 110, other embodiments of the technology disclosed herein may omit the footer insert 110. Some embodiments of the alignment system 100 may utilize a ground screw, or helical pile, such as in FIG. 7 (discussed later), eliminating the need for a footer 110. Accordingly, embodiments employing a ground screw or helical pile as the base does not need a footer insert 120, but are directly connected to the base tube 130. FIG. 7 shows an example embodiment utilizing a ground screw or helical pile in accordance with embodiments of the technology disclosed herein. As illustrated, the base tube 730 is connected directly to the ground screw or helical pile 710 via connector 720. The connector 720 may be, in various embodiments, one or more of bolts, clamping mechanism, welding, grouting, concreting or other mechanical fasteners.

Figure 4A:
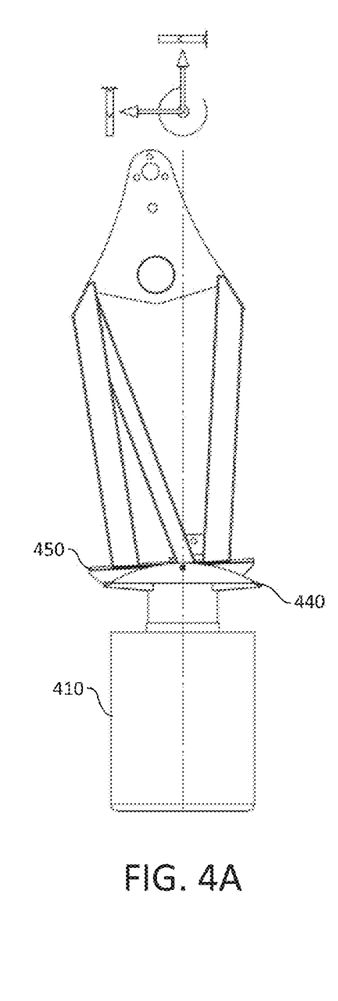
FIGS. 4A and 4B illustrate the rotational and translational motion, respectively around and in the X-direction in accordance with embodiments of the technology of the present disclosure.
Figure 4B:
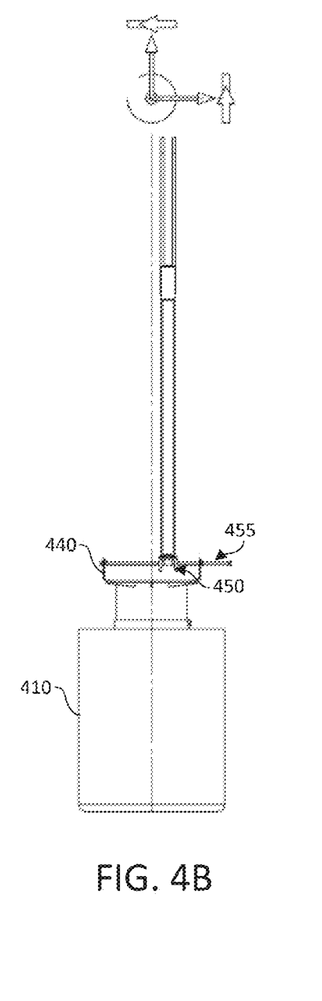

Referring back to the example embodiment of FIG. 1, a rocker 150 rests on a rocker saddle 140; the interaction of the two form the basis of rotation and translation in and around the X-axis, discussed in greater detail with respect to FIGS. 4A and 4B. In various embodiments, the rocker saddle 140 may be spherically shaped, and include a slot 145. The slot 145 allows access to the internal space of the base tube 130 to enable an installer to have access to internal components (described in more detail below with respect to FIG. 2). In various embodiments, the slot 145 may be rectangular, circular, elliptical, or other shape. As pictured in FIG. 7, the rocker saddle 140 may include bolts, set screws, grub screws, clamps and clamp collars, toggle bolt, or other locking mechanisms for securing the rocker 150 in place after adjustments are made. In some embodiments, the rocker 150 may be welded to the rocker saddle 140 to secure the rocker 150 in place after adjustments have been made.

The rocker 150 is configured to rest on a top surface of the rocker saddle 140. The rocker 150 may include a connection bolt 165 for mounting the solar device in some embodiments. Other embodiments may include a plurality of connection bolts 165, depending on the mounting hardware utilized on the particular solar device. In various embodiments, the rocker 150 may include an adjustment slot, similar to the slot 145 discussed with respect to the rocker saddle 140. Said adjustment slot(s) 155 may be used in some embodiments to facilitate translational movement of the support leg with respect to the rocker 150. The support leg of FIG. 3 incorporates similar adjustment slot(s), oriented perpendicular to the slots in rocker 150, to accommodate rotational motion around the Y-axis. Bolts inserted in these slots are used to fasten anchor or clamp the support leg to rocker 150. The rocker 150 and rocker saddle 140 may comprise stainless steel, steel, aluminum, plastic, carbon fiber, or any metal alloy. One or more of the above identified materials may be used in some embodiments. In some embodiments, the rocker saddle 140 may be made of a first material, while the rocker 150 is made of a second material.

The internal aspects of the alignment system 100 will be described with respect to FIG. 2, which illustrates an exploded cross sectional view of the example alignment system. The example alignment system 200 of FIG. 2 includes a footer 210, footer insert 220, base tube 230, rocker saddle 240, and rocker 250, similar to the respective elements discussed with respect to FIG. 1. A threaded rod 260 is inserted into an extension shaft 270, which together form an adjustment device used to control elevation (i.e., Z axis adjustment). The adjustment mechanism is centrally located within the base tube 230. During Z-axis translation, the connection rod 260 rotates with respect to 270 causing 230 to move in a vertical direction with respect to 220. In some embodiments, the connection rod 260 may include a stopper disposed on the end of the connection rod closest to the bottom of the base tube 230, such that the connection rod 260 cannot be fully removed from the extension shaft 270. In this way, the stopper may limit the Z-axis translation.

In some embodiments, the connection rod may extend to an internal support 280 disposed within tube 230. As illustrated, the internal support 280 includes an opening for the connection rod 260 to pass through, and component 285 provides the means to fix rod 260 into the internal support 280 while allowing rotation of rod 260. The connection rod 260 may be secured into the internal support 280 by a locking component 285, such that during Z-axis translation the connection rod 260 will move in conjunction with the base tube 230. In various embodiments, the locking component 285 may be a nut configured to mate with the threaded connection rod 260. The connection rod 260 may be made of one or more of: steel; stainless steel; titanium; metal alloy; plastic; or fiberglass. The support shaft 270 may be made of one or more of: steel; stainless steel; titanium; metal alloy; plastic; or fiberglass. In some embodiments, the connection rod 260 and the support shaft 270 may be made of different materials.

Figure 2:
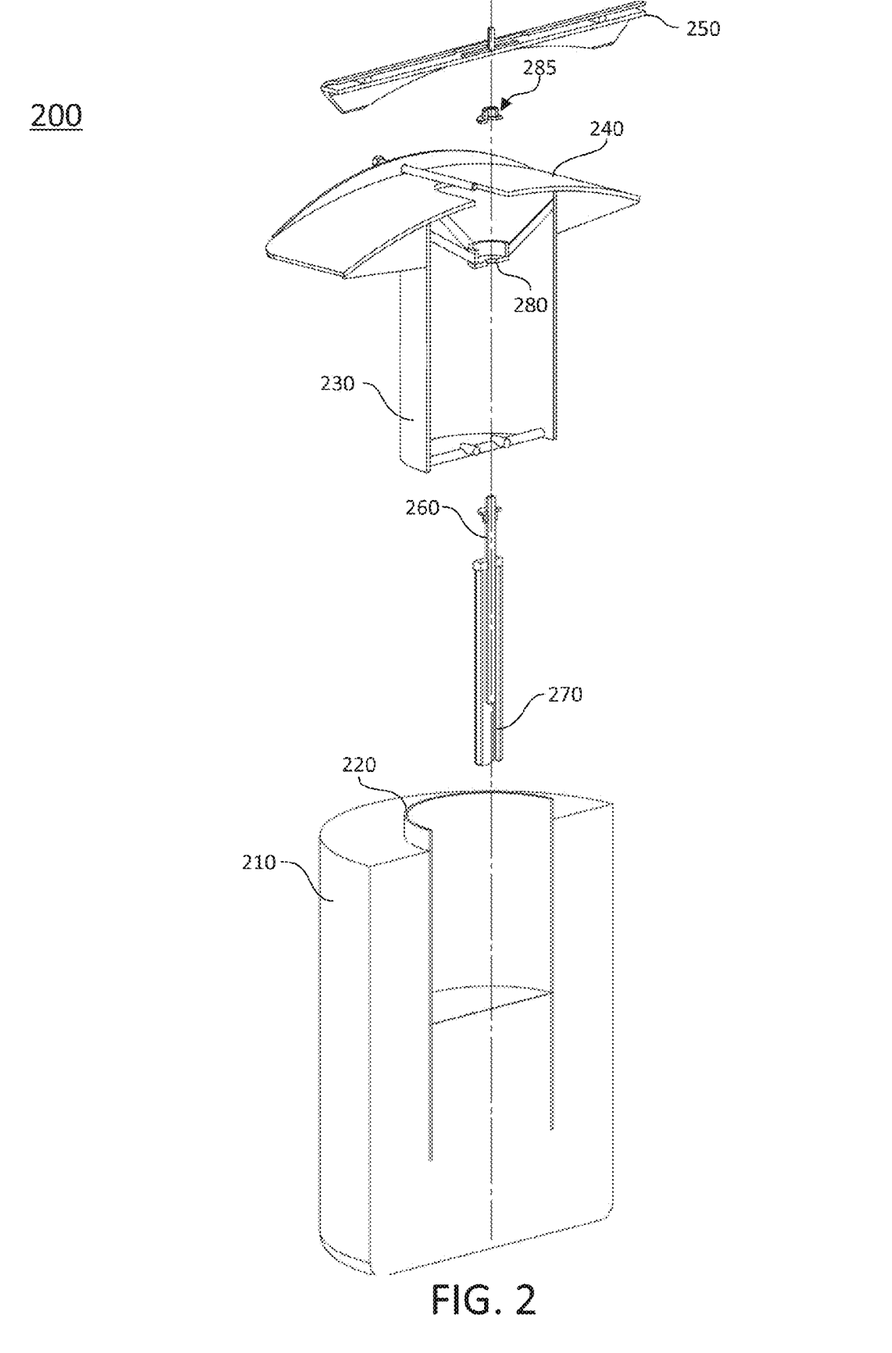
FIG. 2 is an exploded, cross-sectional view of an example alignment system in accordance with embodiments of the technology of the present disclosure.
Figure 3:
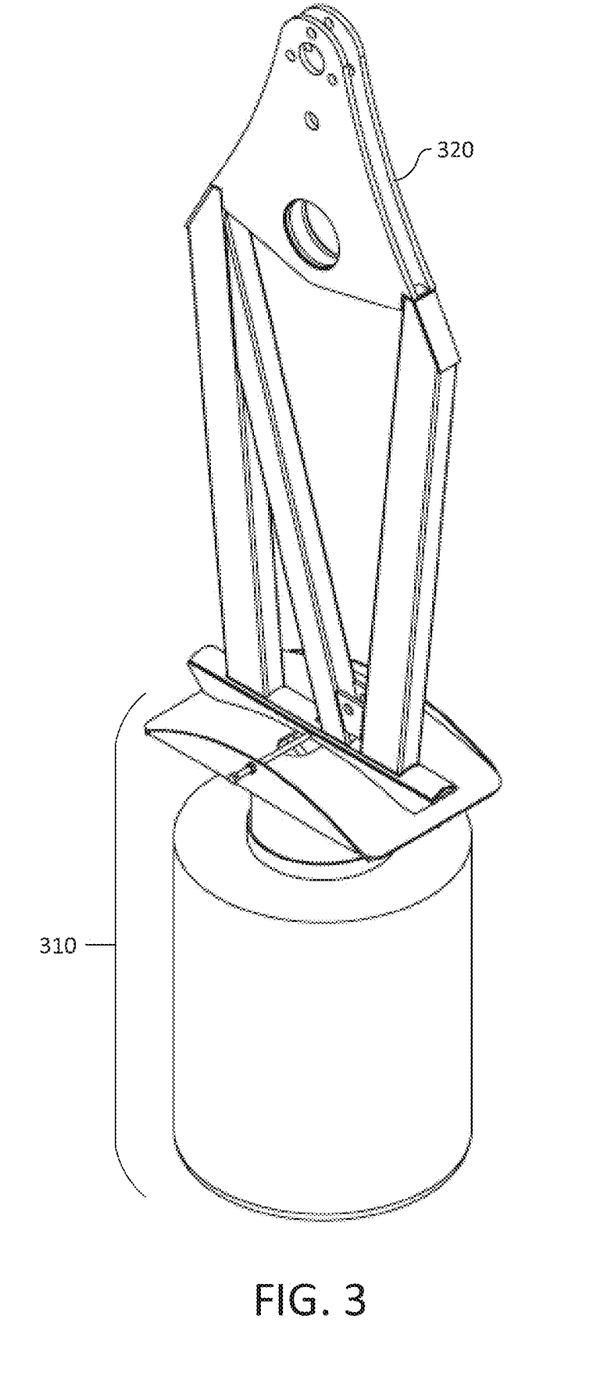
FIG. 3 is an example alignment system with a support leg of a solar device connected, in accordance with embodiments of the technology of the present disclosure.

FIG. 3 illustrates an implementation of the example alignment system described with respect to FIGS. 1 and 2. In the illustrated implementation, the alignment system 310 is shown with a support leg 320 for a solar device to be attached. In some embodiments, the support leg 320 may be similar to the integrated drive leg, described in co-pending U.S. patent application Ser. No. 14/948,676, filed Nov. 23, 2015, or the thin support structure described in co-pending U.S. patent application Ser. No. 15/016,182, filed Feb. 4, 2016, the disclosures of which are hereby incorporated herein by reference in their entirety. In other embodiments, other structures for support solar devices may be used, such as other support legs, frames or poles. For ease of discussion, further elements of embodiments of the present disclosure will be described with respect to embodiments of the alignment system used with a leg supporting a solar device, similar to the legs described in the above identified co-pending applications.

As discussed above, one of the major drawbacks to the simple mounting systems currently utilized is the lack of adjustability. When dealing with the traditional footer system, the mounting screws or bolts are set within the concrete of the footer, limiting any translational or rotational adjustment available to what is achievable based on the tolerance of the mating mounting holes or slots. Any adjustments outside of the limited tolerances designed in or of manufacturing of the mounting hardware require re-installing the footer system or altering the legs of solar installation. To avoid having to start over, extensive, time intensive surveying must be performed before, during and after footer installation to ensure that each step of the construction process is accurate. Employing embodiments of the alignment system in accordance with the technology of the present disclosure, it is possible to provide greater adjustments with less need for extensive surveying and reinstallation in the event that deviations occur. Moreover, the multiple different adjustments capable by embodiments of the technology disclosed herein allow for adjustments to be made for relative deviations in each subsequent individual installation location along a row.

FIGS. 4A and 4B illustrate adjustments in the X-axis enabled by alignment systems in accordance with embodiments of the technology disclosed herein. FIG. 4A illustrates rotation of the alignment system around the X-axis. The X-axis is perpendicular to the dashed vertical line running through the center of the footer 410, into and out of the page. As illustrated, the rocker 450 slides laterally along the shape outlined by the top surface of the rocker saddle 440, which cause rotation of 450 with respect to the x axis. In some embodiments, the alignment system may allow rotation within the range of +/−5° to 20°. Various embodiments may allow rotation of +/−10°. The extent of rotation is dependent on the design of the rocker saddle 440 and rocker 450. The greater the arc of the surface of the rocker saddle, the greater degree of rotation available.

FIG. 4B illustrates translation of the alignment system in the X-axis. As discussed with respect to FIG. 4A, the X-axis is perpendicular to the dashed vertical line running through the center of the footer 410, in this case horizontally along the page. As illustrated in FIG. 4B, the rocker 450 moves laterally across the face of the rocker saddle 440. In some embodiments, the adjustment rod 455 may include stoppers to limit the translation distance possible. The rocker saddle 440 may include one or more slots configured to mate with one or more protrusions on the bottom of the rocker 450 in some embodiments. In some embodiments, the range of translation may be up to +/−10". Various embodiments may allow translation greater than +/−10". Other embodiments may allow translation of +/−4".

Figure 5A:
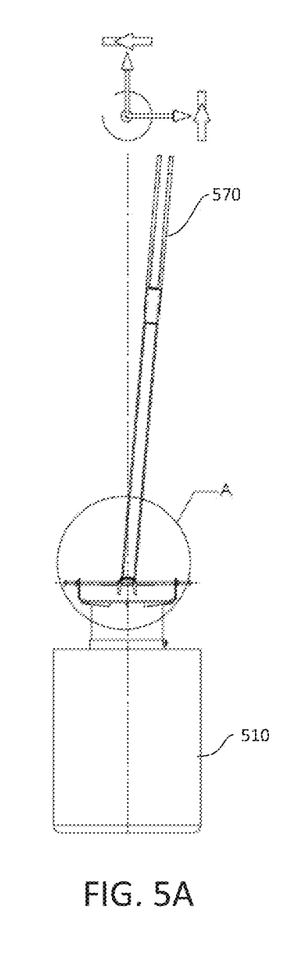
FIGS. 5A, 5B, and 5C illustrate the rotational and translational motion around and in the Y-direction in accordance with embodiments of the technology of the present disclosure.
Figure 5B:
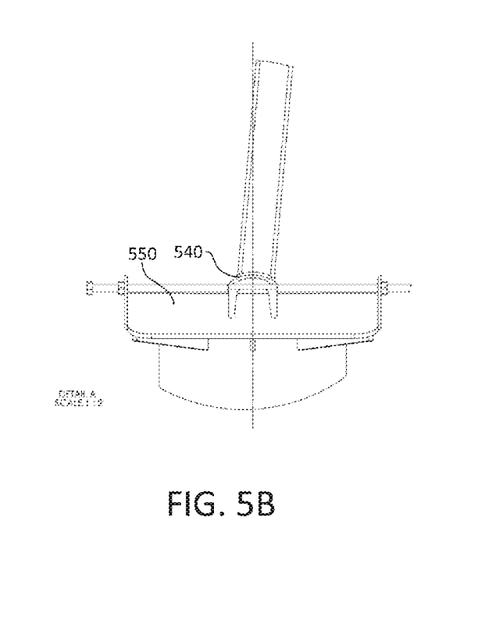
Figure 5C:
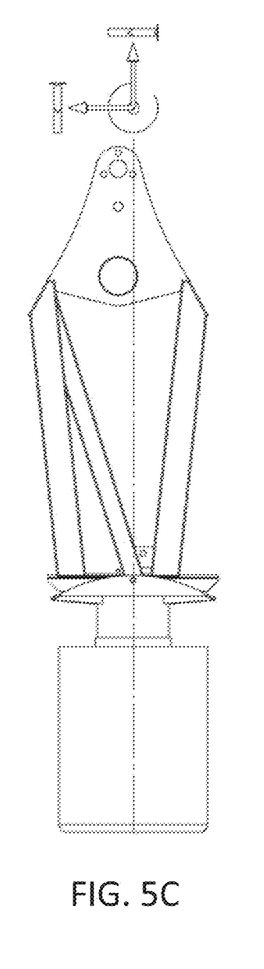

FIGS. 5A, 5B, and 5C illustrate adjustments in the Y-axis capable by alignment systems in accordance with embodiments of the technology disclosed herein. Similar to the X-axis in FIGS. 4A and 4B, the Y-axis is perpendicular to the dashed line extending through the center of the footer 510. The Y-axis is extending outwards from the page in 5A and 5B, while the Z-axis extends vertically and is represented by the dashed line.

FIG. 5A illustrates rotation of the alignment system around the Y-axis. As illustrated in FIG. 5A, the top of rocker 540 has a curvature which mates with the bottom of support leg 570. In this way, a similar rotational motion as discussed above with respect to FIG. 4A is possible to rotate the support leg 570, causing the leg to tilt laterally, as in 5A. A close-up view, detail A, of FIG. 5A is shown in FIG. 5B. In some embodiments, the alignment system may allow rotation within the range of up to 20°. Various embodiments may allow rotation of +/−10°. The extent of rotation is dependent on the design of the rocker 540. The greater the radius of the surface of the rocker, the lesser degree of rotation available.

FIG. 5C illustrates translation of the alignment system in the Y-axis. As illustrated, the support leg 570 is translated to the left of the image (along the Y-axis in this illustration), resulting in the support leg 570 being offset from the center of the alignment system (collocated with the dashed line). In some embodiments, the top of rocker 540 may include a slot or slots, similar to the slot discussed above with respect to FIG. 1 to enable the rocker 540 to remain stationary while the support leg 570 is offset. In some embodiments, the range of translation may be up to +/−10". Various embodiments may allow translation greater than +/−10". Other embodiments may allow translation of +/−4".

Figure 6A:
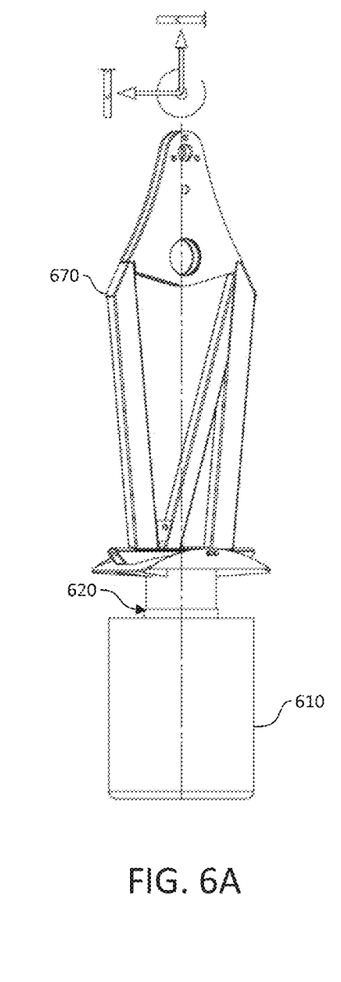
FIGS. 6A and 6B illustrate the rotational and translational motion respectively around and in the Z-direction in accordance with embodiments of the technology of the present disclosure.
Figure 6B:
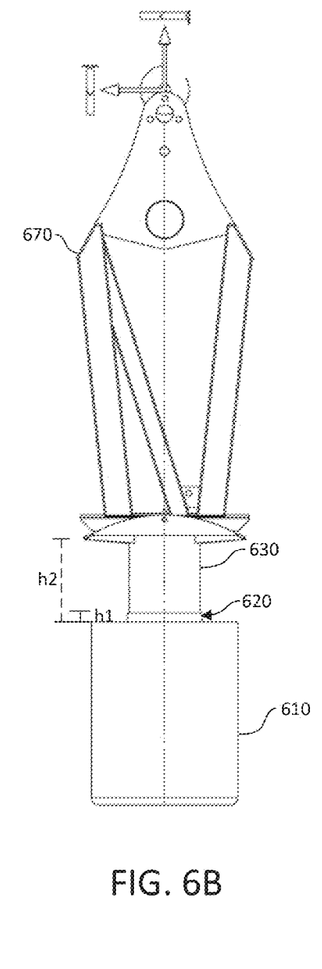

FIGS. 6A and 6B illustrate adjustments in the Z-axis capable by alignments systems in accordance with embodiments of the technology disclosed herein. The Z-axis is illustrated by the dashed line extending vertically on the page through the center of the footer 610. The rotation of the support leg 670 can be seen through comparison of the position of the support leg 670 in FIG. 6A and the position of the support leg 670 in FIG. 6B. The support leg 670 may rotate around the Z-axis to any degree without limits, enabling an installer to position the support leg 670 correctly to ensure the solar device is properly positioned.

FIG. 6B illustrates translation of the alignment system along the Z-axis. As illustrated, the support leg 670 is translated upwards to height h2 from minimum height h1. In some embodiments, when the support leg 670 is translated upwards, the base tube 630 rises out of the footer insert 620. In some embodiments, the range of translation may be up to +/−10". Various embodiments may allow translation greater than +/−10".

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a base tube in communication with a mounting base, the base tube configured to translate in a first direction and rotate in a second direction in relation to the mounting base;
   a rocker saddle disposed on the top of the base tube; and
   a rocker in translational and rotational communication with the rocker saddle, the rocker configured to translate in a third direction and rotate in a fourth direction in relation to the rocker saddle; and
   the rocker comprising one or more connectors configured to mate with a solar device support structure;
   wherein the solar device support structure is in communication with the rocker and configured to translate in a fifth direction and rotate in a sixth direction in relation to the rocker;
   wherein the mounting base comprises a footer and a footer insert, and wherein the base tube is configured to translate in the first direction and rotate in the second direction in relation to the footer insert.

2. The system of claim 1, wherein an outside face of the base tube is in communication with an inside face of the footer insert.

3. The system of claim 1, wherein an inside face of the base tube is in communication with an outside face of the footer insert.

4. The system of claim 1, the footer insert comprising one or more of: stainless steel; steel; aluminum; plastic; fiberglass or carbon fiber.

5. The system of claim 1, wherein the mounting base comprises a ground screw, and wherein the base tube is configured to translate in the first direction and rotate in the second direction in relation to the ground screw.

6. The system of claim 1, wherein the rocker saddle is permanently affixed to a top of the base tube.

7. The system of claim 1, the rocker saddle comprising one or more slots.

8. A system, comprising:
   a base tube in communication with a mounting base, the base tube configured to translate in a first direction and rotate in a second direction in relation to the mounting base:
   a rocker saddle disposed on the top of the base tube; and
   a rocker in translational and rotational communication with the rocker saddle, the rocker configured to translate in a third direction and rotate in a fourth direction in relation to the rocker saddle; and
   the rocker comprising one or more connectors configured to mate with a solar device support structure;
   wherein the solar device support structure is in communication with the rocker and configured to translate in a fifth direction and rotate in a sixth direction in relation to the rocker;
   the rocker saddle comprising a plurality of slots, wherein one or more of the plurality of slots is configured to mate with one or more protrusions extending from the rocker.

9. The system of claim 1, the rocker saddle comprising one or more adjustment rods.

10. The system of claim 1, the base tube comprising one or more internal support structures.

11. The system of claim 1, the rocker saddle comprising one or more mechanical fasteners configured to secure the rocker in an orientation, the mechanical fasteners comprising one or more of: bolts; set screws; grub screws; clamps and clamp collars; or toggle bolts.

12. A system, comprising:
a base tube in communication with a mounting base, the base tube configured to translate in a first direction and rotate in a second direction in relation to the mounting base;
a rocker saddle disposed on the top of the base tube; and
a rocker in translational and rotational communication with the rocker saddle, the rocker configured to translate in a third direction and rotate in a fourth direction in relation to the rocker saddle; and
the rocker comprising one or more connectors configured to mate with a solar device support structure;
wherein the solar device support structure is in communication with the rocker and configured to translate in a fifth direction and rotate in a sixth direction in relation to the rocker;
the rocker further comprising a slot on a top of the rocker configured to enable the one or more connectors to move laterally along a length of the rocker.

13. The system of claim 1, the base tube, the rocker saddle, and the rocker comprising one or more of: stainless steel, steel, aluminum, plastic, fiberglass or carbon fiber.

14. The system of claim 1, wherein the base tube is configured to translate between −10" and 10" in relation to the mounting base, and rotate 360° in relation to the mounting base.

15. The system of claim 1, wherein the base tube is configured to translate between −5" and 5" in relation to the mounting base, and rotate without limits in relation to the mounting base.

16. The system of claim 1, wherein the rocker is configured to translate between −10" and 10" in relation to the rocker saddle, and rotate between −20° and 20° in relation to the rocker saddle.

17. The system of claim 1, wherein the solar device is configured to translate between −10" and 10" in relation to the rocker, and rotate between −20° and 20° in relation to the rocker.

* * * * *